US012454340B2

(12) United States Patent
Saruwatari et al.

(10) Patent No.: US 12,454,340 B2
(45) Date of Patent: Oct. 28, 2025

(54) OUTBOARD MOTOR

(71) Applicant: YAMAHA HATSUDOKI KABUSHIKI KAISHA, Iwata (JP)

(72) Inventors: Kimitaka Saruwatari, Shizuoka (JP); Seiji Arai, Shizuoka (JP); Shuhei Okamoto, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 700 days.

(21) Appl. No.: 17/858,109

(22) Filed: Jul. 6, 2022

(65) Prior Publication Data

US 2023/0035557 A1 Feb. 2, 2023

(30) Foreign Application Priority Data

Jul. 30, 2021 (JP) ................................ 2021-125693

(51) Int. Cl.

| | |
|---|---|
| ***B63H 20/26*** | (2006.01) |
| ***B63H 20/24*** | (2006.01) |
| ***B63H 23/34*** | (2006.01) |
| ***F01N 13/00*** | (2010.01) |
| ***F01N 13/12*** | (2010.01) |
| ***F02B 61/04*** | (2006.01) |

(Continued)

(52) U.S. Cl.
CPC ........... *B63H 20/26* (2013.01); *B63H 20/245* (2013.01); *B63H 23/34* (2013.01); *F01N 13/001* (2013.01); *B63H 20/24* (2013.01); *B63H 20/32* (2013.01); *F01M 11/0004* (2013.01); *F01N 13/004* (2013.01); *F01N 13/12* (2013.01); *F01N 2590/021* (2013.01); *F02B 61/045* (2013.01)

(58) Field of Classification Search
CPC ...... B63H 20/245; B63H 20/32; B63H 23/34; B63H 20/26; B63H 20/24; B63H 20/14; F01M 11/0004
See application file for complete search history.

(56) References Cited

U.S. PATENT DOCUMENTS 5,674,099 A * 10/1997 Muramatsu ............. F01N 1/089 440/89 R
6,413,129 B1 * 7/2002 Okuzawa .............. F02B 61/045 440/78

(Continued)

FOREIGN PATENT DOCUMENTS

JP 2013-124594 A 6/2013

*Primary Examiner* — S. Joseph Morano
*Assistant Examiner* — Eric Anthony Starck
(74) *Attorney, Agent, or Firm* — Keating & Bennett, LLP

(57) ABSTRACT

An outboard motor includes a first case accommodating an engine and an upper housing below the first case. At least a portion of an exhaust passage is in the upper housing and extends downward from the engine. A second case is below the upper housing. The second case includes a torpedo portion, an exhaust inlet, an exhaust outlet, and an exhaust chamber. The torpedo portion includes an internal space and a rear end. A propeller shaft is in the internal space of the torpedo portion. The rear end of the torpedo portion is forward of at least a portion of the exhaust passage as seen in a side view. The exhaust passage is connected to the exhaust inlet. The exhaust outlet communicates with the internal space of the torpedo section. The exhaust chamber communicates the exhaust inlet with the exhaust outlet.

11 Claims, 10 Drawing Sheets

(51) Int. Cl.
*B63H 20/32* (2006.01)
*F01M 11/00* (2006.01)

(56) References Cited

U.S. PATENT DOCUMENTS

| | | | | |
|---|---|---|---|---|
| 6,537,116 | B2 * | 3/2003 | Nakata | F01N 13/12 440/88 G |
| 6,746,290 | B2 * | 6/2004 | Nakata | B63H 20/245 440/89 R |
| 6,783,413 | B2 * | 8/2004 | Nakata | F01N 13/004 440/89 R |
| 7,001,231 | B1 * | 2/2006 | Halley | B63H 20/245 440/89 B |
| 9,909,479 | B2 * | 3/2018 | Shomura | F02M 35/12 |
| 2008/0070739 | A1 * | 3/2008 | Nakamura | B63H 20/14 475/269 |
| 2013/0157533 | A1 | 6/2013 | Kato et al. | |

* cited by examiner

OUTBOARD MOTOR

CROSS REFERENCE TO RELATED APPLICATIONS

This application claims the benefit of priority to Japanese Patent Application No. 2021-125693 filed on Jul. 30, 2021. The entire contents of this application are hereby incorporated herein by reference.

BACKGROUND OF THE INVENTION

1. Field of the Invention

The present invention relates to an outboard motor.

2. Description of the Related Art

An outboard motor includes an exhaust passage for exhausting the exhaust gas from the engine to the outside of the outboard motor. For example, in the outboard motor of Japan Laid-open Patent Application Publication No. 2013-124594, the exhaust passage extends downward from the engine. The exhaust passage passes through the inside of the upper housing and the lower housing and is connected to the internal space of the torpedo portion.

In the above-mentioned outboard motor, the exhaust passage has a shape bent in the front-rear direction in the upper housing. Therefore, the pressure loss in the exhaust passage increases. In addition, the exhaust passage reduces the available space in the upper housing for accommodating other parts. Alternatively, the outboard motor becomes large in order to accommodate other parts in the upper housing while avoiding interference with the exhaust passage.

SUMMARY OF THE INVENTION

Preferred embodiments of the present invention each reduce pressure loss in exhaust passages of outboard motors and prevent an increase in the size of outboard motors.

An outboard motor according to a preferred embodiment of the present invention includes an engine, a drive shaft, a propeller shaft, a first case, an upper housing, an exhaust passage, and a second case. The drive shaft extends downward from the engine. The propeller shaft is connected to the drive shaft and extends in a front-rear direction of the outboard motor. The first case accommodates the engine. The upper housing is below the first case. At least a portion of the exhaust passage is in the upper housing and extends downward from the engine. The second case is below the upper housing. The second case includes a torpedo portion, an exhaust inlet, an exhaust outlet, and an exhaust chamber. The torpedo portion includes an internal space and a rear end. The propeller shaft is in the internal space of the torpedo portion. The rear end of the torpedo portion is located forward of at least a portion of the exhaust passage as seen in a side view of the outboard motor. The exhaust passage is connected to the exhaust inlet. The exhaust outlet communicates with the internal space of the torpedo portion. The exhaust chamber communicates the exhaust inlet with the exhaust outlet.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
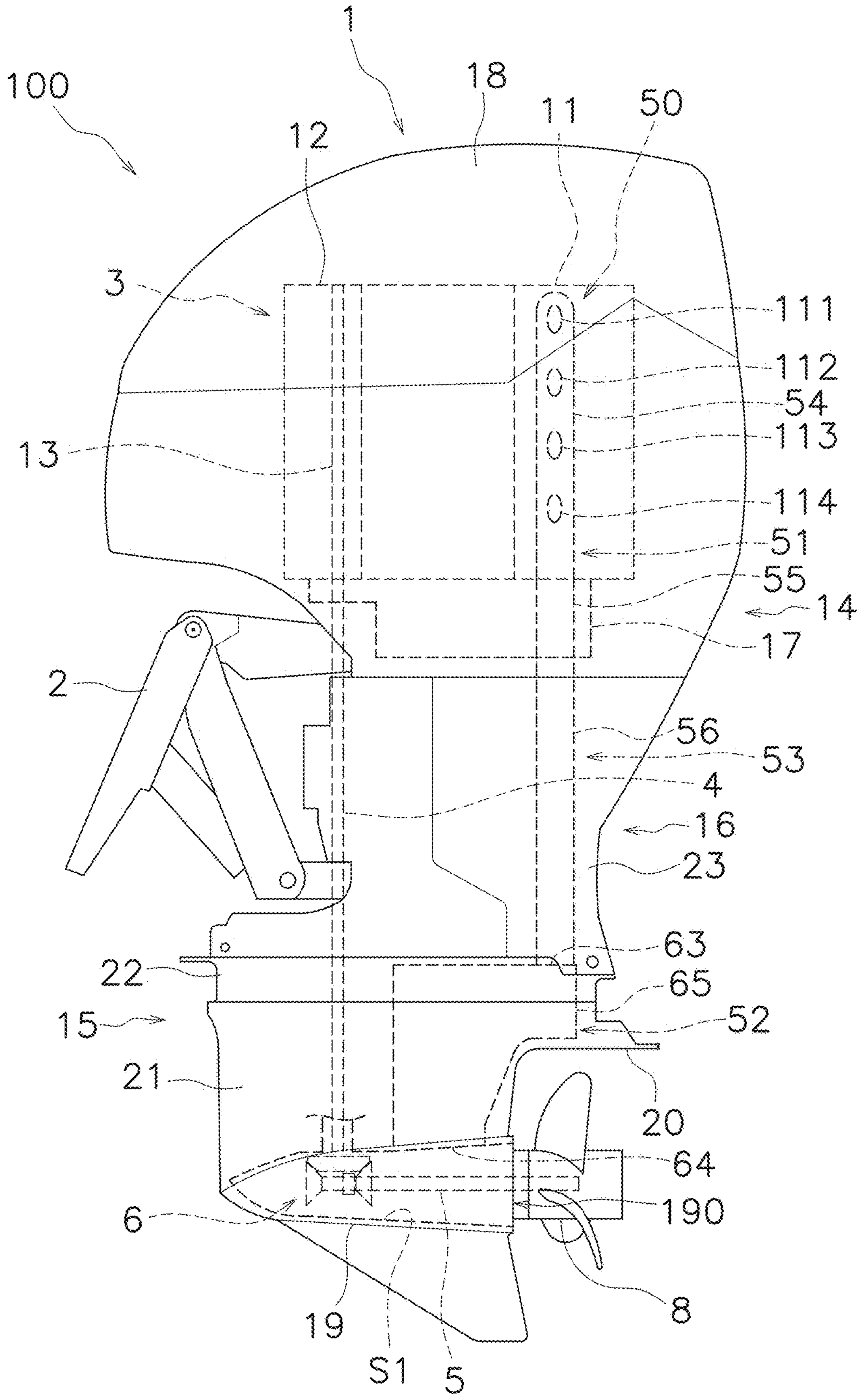
FIG. 1 is a side view of an outboard motor according to a preferred embodiment of the present invention.

Hereinafter, preferred embodiments of the present invention will be described with reference to the drawings. FIG. 1 is a side view of an outboard motor 100 according to a preferred embodiment of the present invention. The outboard motor 100 includes an outboard motor body 1 and a bracket 2. The outboard motor body 1 is attached to a marine vessel via the bracket 2. The bracket 2 is connected to the outboard motor body 1. The bracket 2 is attached to the marine vessel. The outboard motor body 1 includes an engine 3, a drive shaft 4, a propeller shaft 5, and a shift mechanism 6.

The engine 3 generates a thrust that propels the marine vessel. The engine 3 includes a cylinder head 11, a crankcase 12, and a crank shaft 13. The cylinder head 11 includes exhaust ports 111 to 114. The crankcase 12 is connected to the cylinder head 11. The crank shaft 13 is arranged in the crankcase 12. The crank shaft 13 extends in a vertical direction of the outboard motor 100. The drive shaft 4 is connected to the crank shaft 13. The drive shaft 4 extends in the vertical direction of the outboard motor 100. The drive shaft 4 extends downward from the engine 3.

The propeller shaft 5 extends in a front-rear direction of the outboard motor 100. The propeller shaft 5 is connected to the drive shaft 4 via the shift mechanism 6. A propeller 8 is attached to the propeller shaft 5. The shift mechanism 6 includes a plurality of gears and a clutch. The shift mechanism 6 switches the transmission direction of rotation from the drive shaft 4 to the propeller shaft 5. As a result, the forward and reverse directions of the marine vessel are switched.

The outboard motor body 1 includes a first case 14, a second case 15, and an upper housing 16. The first case 14 houses the engine 3. The first case 14 includes a support frame 17 and an engine cowl 18. The engine 3 is arranged on the support frame 17. The support frame 17 supports the engine 3 from below. The engine cowl 18 covers the support frame 17 and the engine 3. The engine cowl 18 is made of, for example, resin. Alternatively, the engine cowl 18 may be made of metal such as aluminum or stainless steel.

The second case 15 is arranged below the first case 14. The second case 15 is arranged below the upper housing 16. The second case 15 houses the propeller shaft 5 and the shift mechanism 6. The second case 15 is made of metal such as aluminum or stainless steel. The second case 15 includes a torpedo portion 19 and a cavitation plate 20. The torpedo portion 19 includes a first internal space S1 in which the propeller shaft 5 is arranged. The cavitation plate 20 projects rearward.

The second case 15 includes a lower housing 21 and an attachment 22. The lower housing 21 is a separate body from the attachment 22. The attachment 22 is connected to the upper housing 16. The attachment 22 is arranged on the lower housing 21. The attachment 22 is attached to the lower housing 21.

Figure 2:
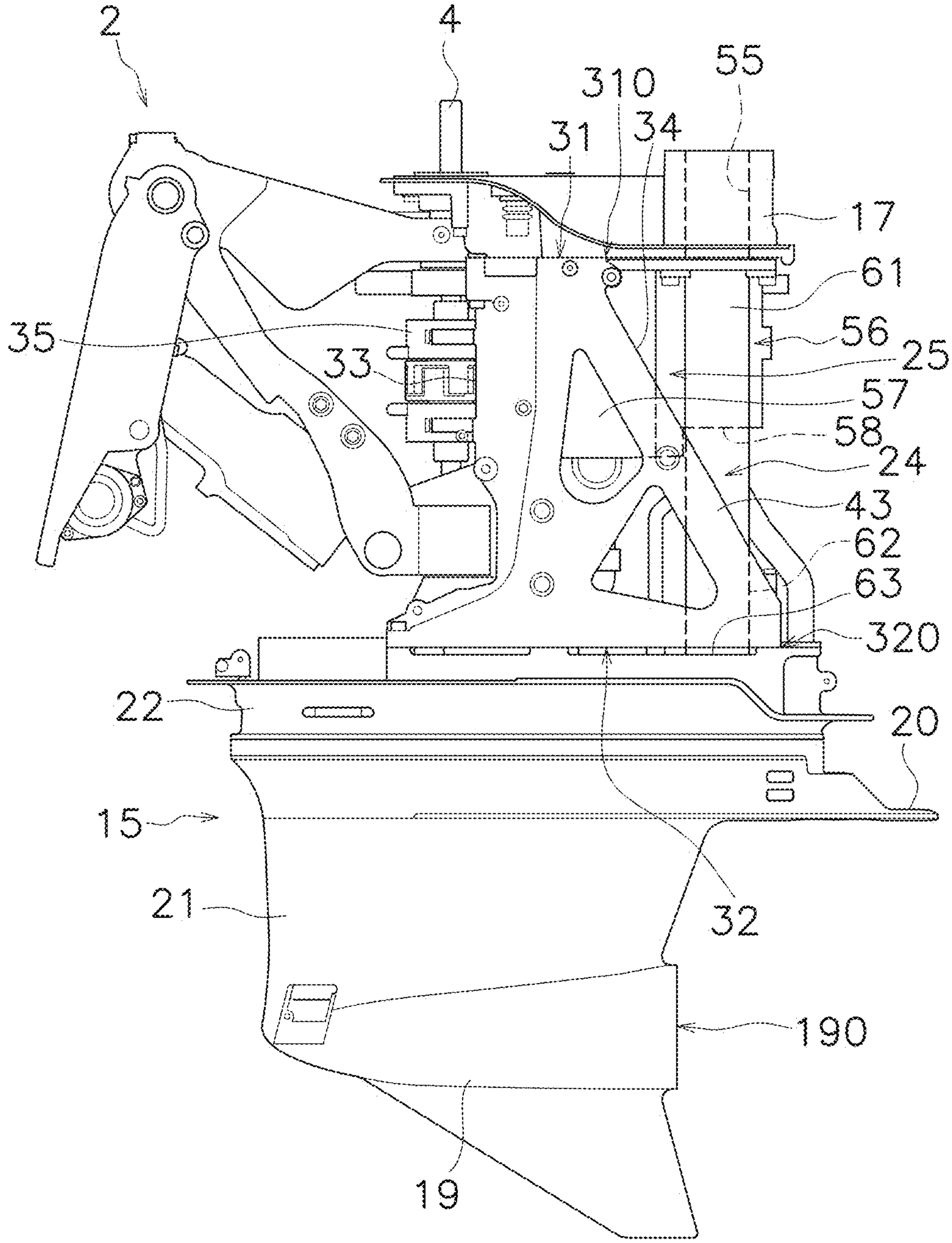
FIG. 2 is a side view of a lower portion of the outboard motor from which an exterior cover has been removed.

The upper housing 16 is arranged below the first case 14. The upper housing 16 includes an exterior cover 23. The exterior cover 23 is arranged between the first case 14 and the second case 15 in the vertical direction. FIG. 2 is a side view of the lower portion of the outboard motor 100 from which the exterior cover 23 has been removed. As shown in FIG. 2, the upper housing 16 (not shown) includes a third case 24. The third case 24 is arranged in the exterior cover 23. The exterior cover 23 covers the third case 24 from the outside. The exterior cover 23 is made of, for example, resin. However, the exterior cover 23 may be made of metal such as aluminum or stainless steel. The exterior cover 23 covers the third case 24 from the lateral side.

Figure 3:
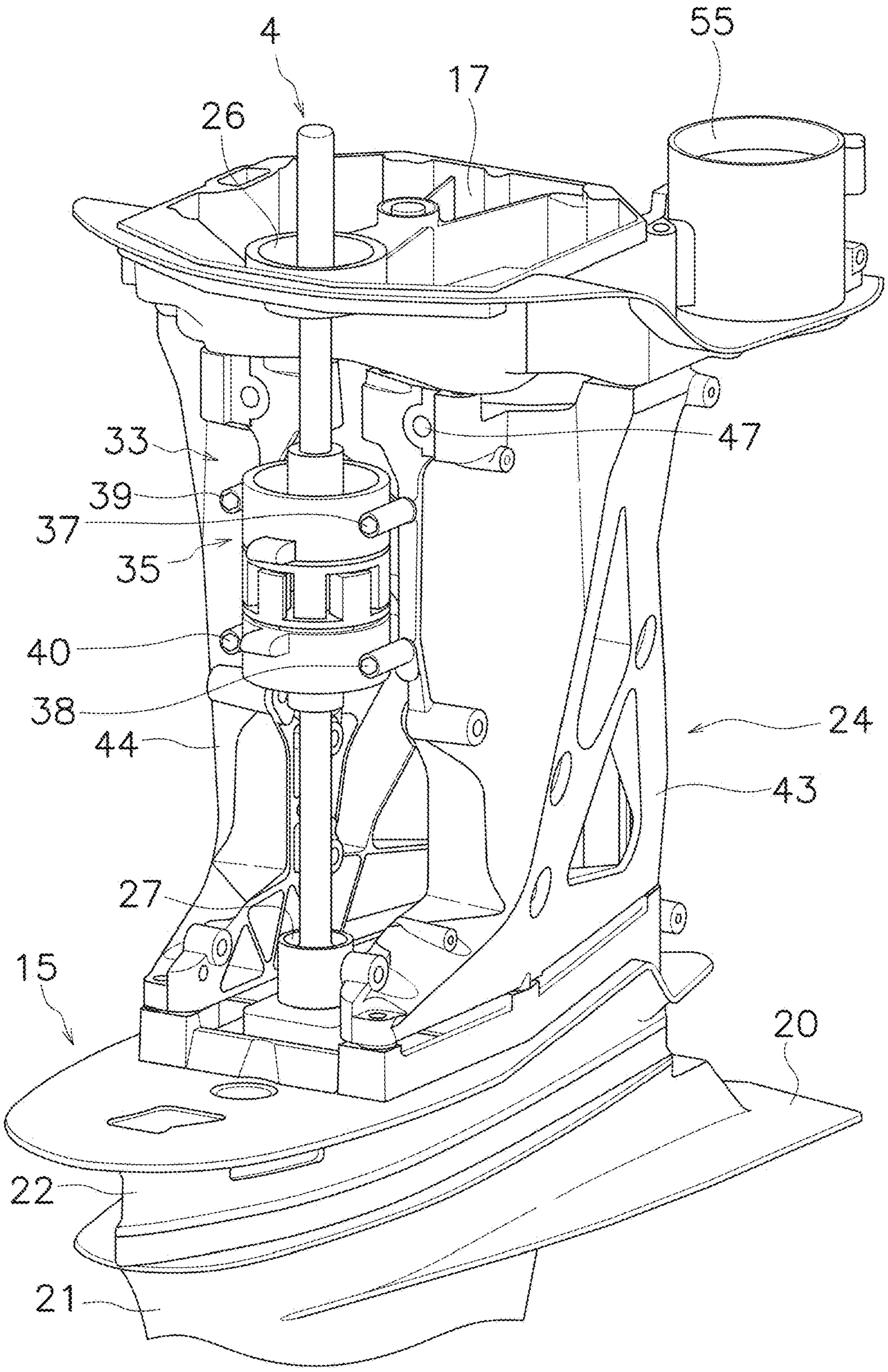
FIG. 3 is a perspective view of the lower portion of the outboard motor from which the exterior cover and a bracket have been removed.
Figure 4:
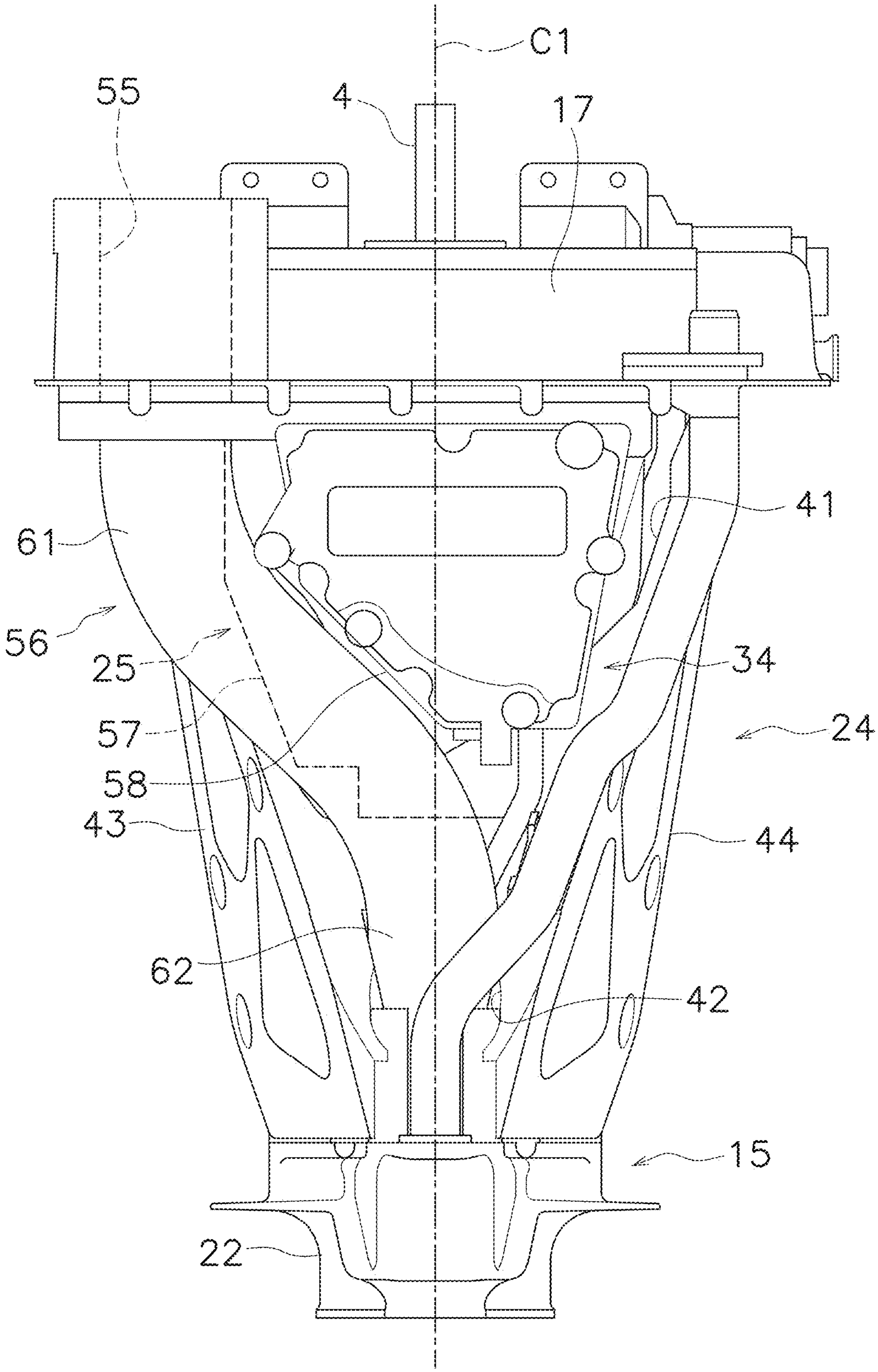
FIG. 4 is a rear view of the lower portion of the outboard motor from which the exterior cover and the bracket have been removed.
Figure 5:
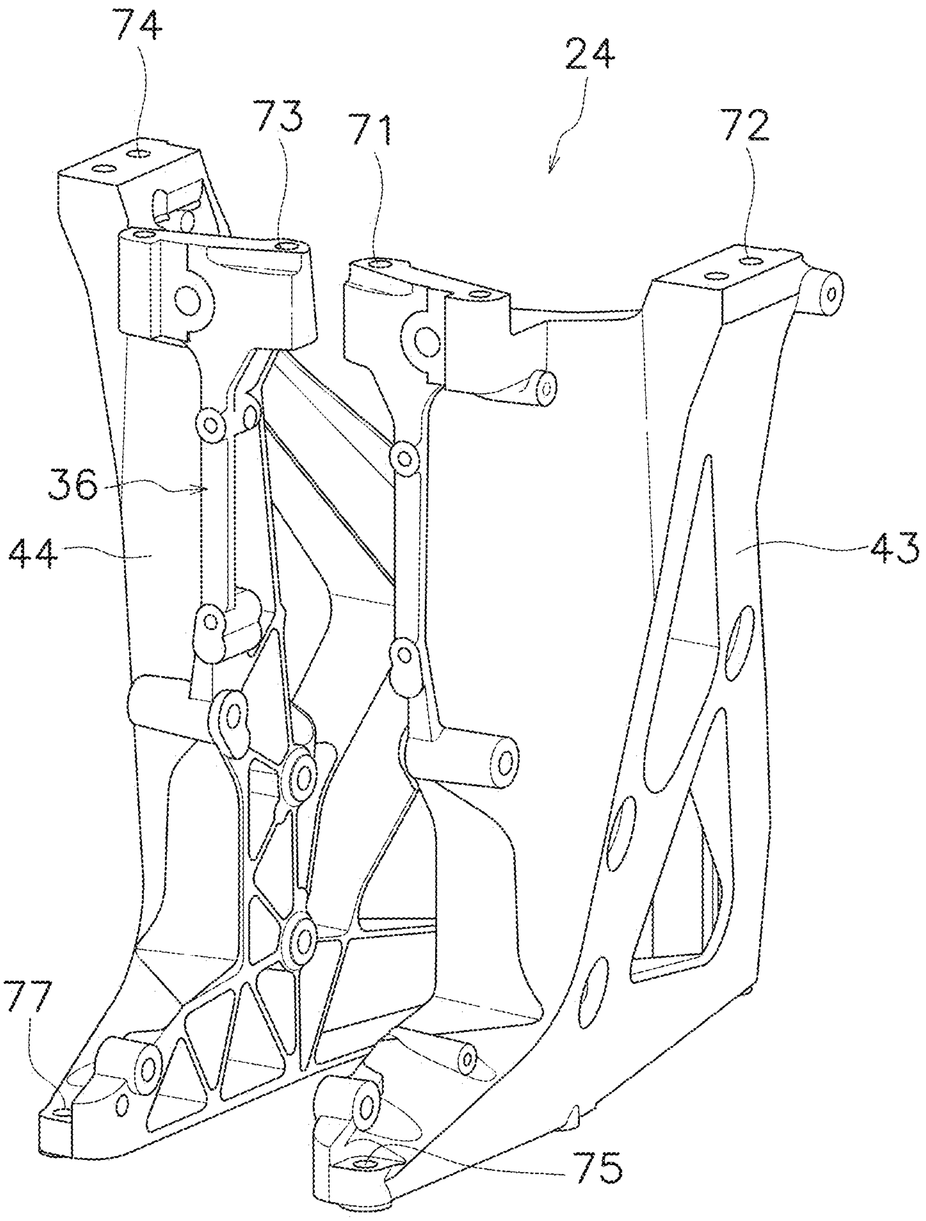
FIG. 5 is a perspective view of a third case.
Figure 6:
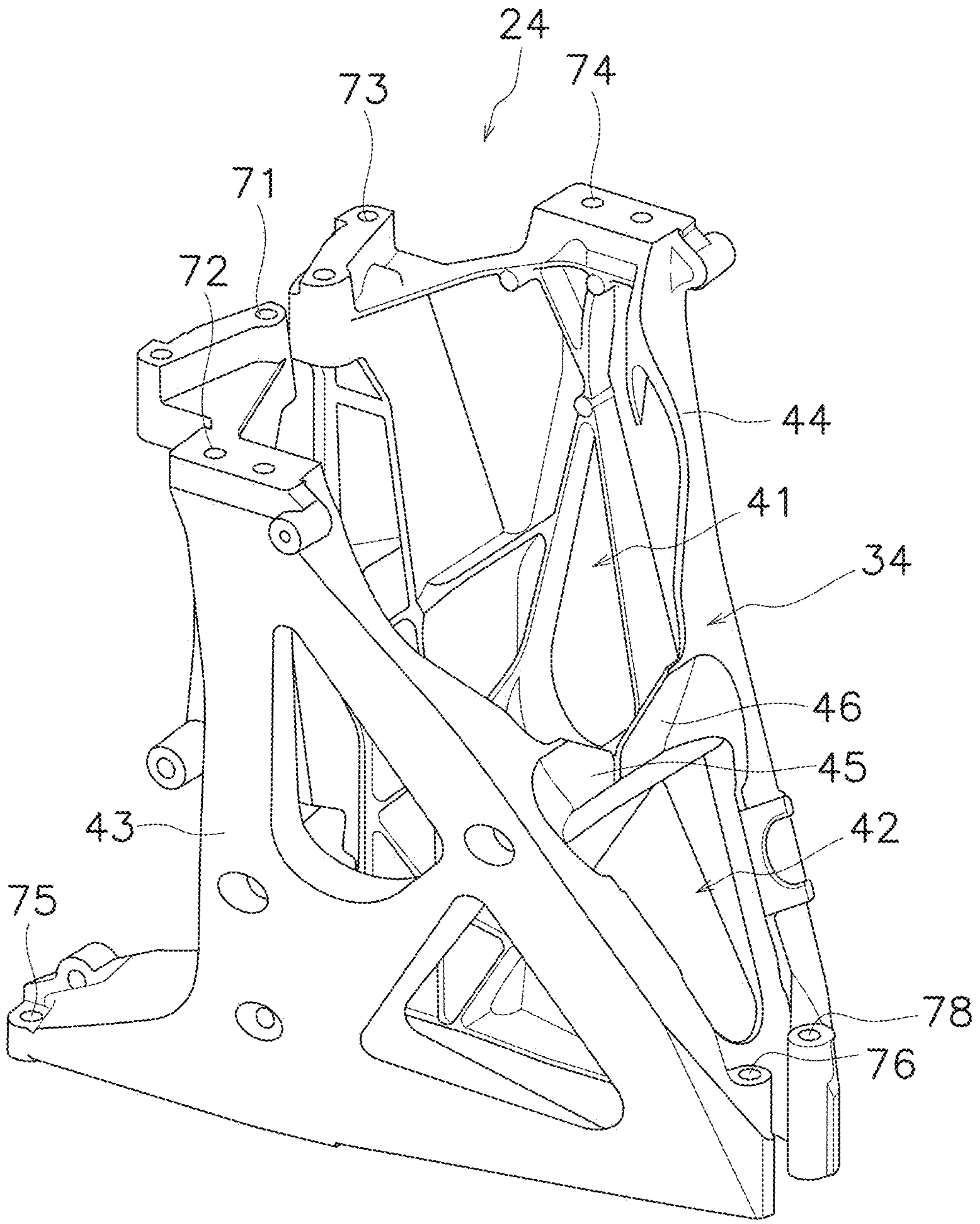
FIG. 6 is a perspective view of the third case.
Figure 7:
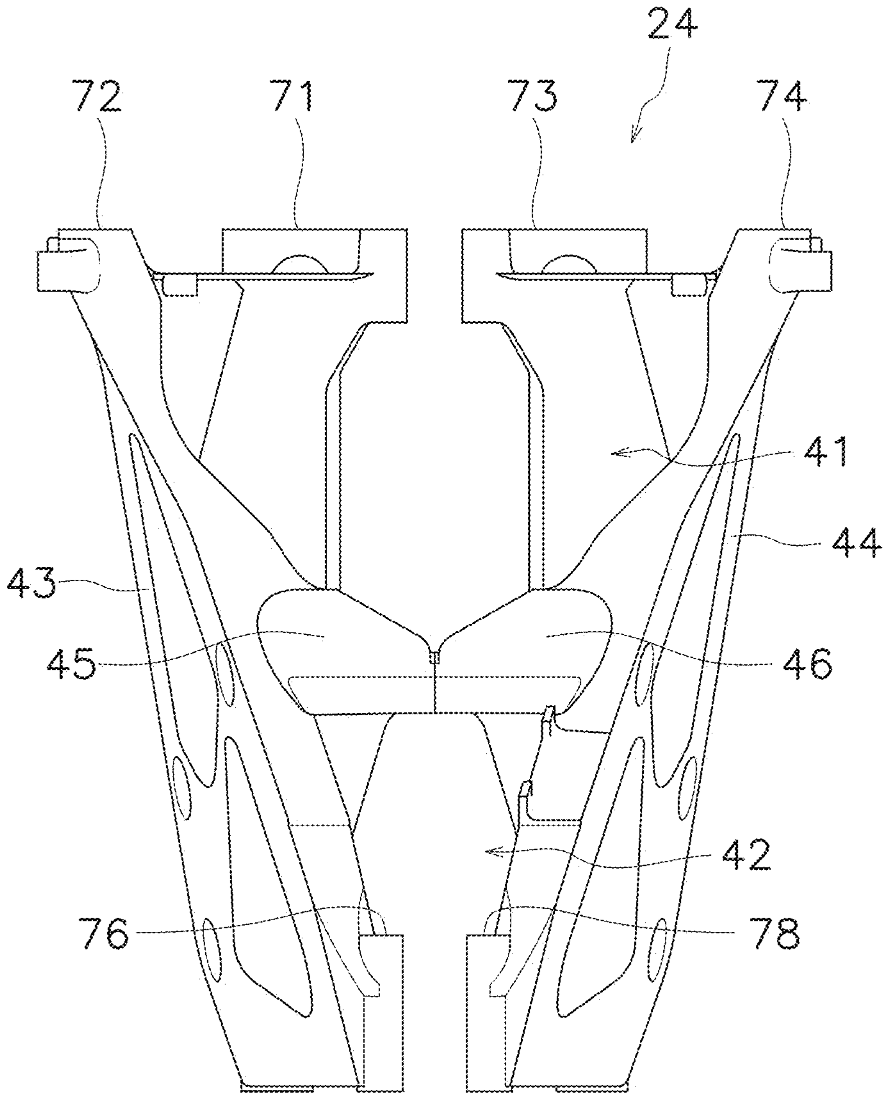
FIG. 7 is a rear view of the third case.

FIG. 3 is a perspective view of the lower portion of the outboard motor 100 from which the exterior cover 23 and the bracket 2 have been removed. FIG. 4 is a rear view of the lower portion of the outboard motor 100 from which the exterior cover 23 and the bracket 2 have been removed. FIGS. 5 and 6 are perspective views of the third case 24. FIG. 7 is a rear view of the third case 24.

As shown in FIGS. 2 to 4, the third case 24 is arranged between the first case 14 (not shown) and the second case 15 in the vertical direction. The support frame 17 is arranged on and attached to the third case 24. The third case 24 is arranged on the second case 15. The third case 24 is attached to the second case 15. The third case 24 is made of metal such as aluminum or stainless steel.

As shown in FIG. 2, an oil pan 25 is arranged in the third case 24. The oil pan 25 is arranged below the support frame 17. The oil pan 25 is connected to the support frame 17. The oil pan 25 is connected to the engine 3 via the support frame 17.

The drive shaft 4 is arranged in front of the third case 24. As shown in FIG. 3, the support frame 17 includes a hole 26. The drive shaft 4 extends into the first case 14 through the hole 26 of the support frame 17. The attachment 22 includes a hole 27. The hole 27 is provided on the upper surface of the attachment 22. The drive shaft 4 extends into the second case 15 through the hole 27 of the attachment 22.

As shown in FIG. 2, the third case 24 includes an upper edge 31, a lower edge 32, a front surface 33, and a rear surface 34. The upper edge 31 is connected to the first case 14. The lower edge 32 is connected to the second case 15. Specifically, the upper edge 31 is connected to the support frame 17. The lower edge 32 is connected to the attachment 22. As seen in the side view, the lower edge 32 is longer than the upper edge 31 in the front-rear direction.

The front surface 33 of the third case 24 extends in the vertical direction. A bearing 35 is attached to the front surface 33 of the third case 24. The bearing 35 rotatably supports the drive shaft 4. As shown in FIG. 5, the third case 24 includes a fixing portion 36 for the bearing 35. The bearing 35 is detachably fixed to the fixing portion 36 by bolts 37 to 40, for example.

The rear surface 34 of the third case 24 extends diagonally rearward and downward as seen in the side view. As shown in FIG. 7, as seen in the rear view, the width of the third case 24 in a left-right direction of the outboard motor 100 decreases as it extends downward. As shown in FIGS. 6 and 7, the rear surface 34 of the third case 24 includes a first opening 41 and a second opening 42. A portion of the oil pan 25 described above projects rearward from the first opening 41. The second opening 42 is arranged below the first opening 41.

The third case 24 includes a left case 43 and a right case 44. The left case 43 and the right case 44 are separate bodies from each other. The left case 43 and the right case 44 are arranged apart from each other in the left-right direction. The first opening 41 and the second opening 42 are provided between the left case 43 and the right case 44. The left case 43 includes a left link 45. The right case 44 includes a right link 46. The left link 45 and the right link 46 extend in the left-right direction and are connected to each other. The first opening 41 is arranged above the left and right links 45 and 46. The second opening 42 is arranged below the left and right links 45 and 46.

As shown in FIGS. 5 and 6, the third case 24 includes upper fixing portions 71 to 74. The upper fixing portions 71 to 74 are fixed to the support frame 17. The upper fixing portions 71 and 72 are provided on an upper edge of the left case 43. The upper fixing portions 73 and 74 are provided on an upper edge of the right case 44. The third case 24 includes lower fixing portions 75 to 78. The lower fixing portions 75 to 78 are fixed to the attachment 22. The lower fixing portions 75 and 76 are provided on a lower edge of the left case 43. The lower fixing portions 77 and 78 are provided on a lower edge of the right case 44.

Next, the exhaust passage of the outboard motor 100 will be described. As shown in FIG. 1, the outboard motor 100 includes an exhaust passage 50. The exhaust passage 50 extends from the engine 3 to the first internal space S1 in the torpedo portion 19. The exhaust gas from the engine 3 passes through the exhaust passage 50 and the first internal space S1 of the torpedo portion 19, and is discharged to the outside of the outboard motor 100 from a rear end 190 of the torpedo portion 19.

The exhaust passage 50 includes a first exhaust passage 51, a second exhaust passage 52, and a third exhaust passage 53. The first exhaust passage 51 is arranged in the first case 14. The second exhaust passage 52 is arranged in the second case 15. The third exhaust passage 53 is arranged in the upper housing 16. The third exhaust passage 53 is arranged between the first exhaust passage 51 and the second exhaust passage 52. The third exhaust passage 53 connects the first exhaust passage 51 and the second exhaust passage 52.

The first exhaust passage 51 is connected to the exhaust ports 111 to 114. The first exhaust passage 51 extends downward from the exhaust ports 111 to 114 on the lateral side of the cylinder head 11 through the inside of the support frame 17. As seen in the side view, the first exhaust passage 51 extends linearly in the vertical direction. As seen in the side view, the first exhaust passage 51 overlaps with the cylinder head 11.

The first exhaust passage 51 includes an exhaust manifold 54 and an exhaust hole 55. The exhaust manifold 54 is connected to the exhaust ports 111 to 114. As seen in the side view, the exhaust manifold 54 extends linearly downward from the exhaust ports 111 to 114. The exhaust manifold 54 is attached to the side surface of the cylinder head 11. The exhaust hole 55 extends through the support frame 17 in the vertical direction. The exhaust manifold 54 is connected to an upper end of the exhaust hole 55. As shown in FIG. 4, as seen in the rear view, the exhaust hole 55 is arranged eccentrically from a center line C1 in the width direction of the outboard motor 100 and that extends in the vertical direction of the outboard motor 100.

As shown in FIG. 1, the third exhaust passage 53 includes an exhaust pipe 56. The exhaust pipe 56 is arranged between the first case 14 and the second case 15 in the vertical direction. Specifically, the exhaust pipe 56 is arranged between the support frame 17 and the attachment 22 in the vertical direction. As shown in FIG. 2, the exhaust pipe 56 is connected to a lower end of the exhaust hole 55 of the support frame 17. As seen in the side view, the exhaust pipe 56 extends linearly in the vertical direction. The exhaust pipe 56 is a separate body from the third case 24.

A portion of the exhaust pipe 56 is arranged outside the third case 24. A portion of the exhaust pipe 56 is arranged inside the third case 24. That is, a portion of the exhaust pipe 56 is arranged between the left case 43 and the right case 44. The exhaust pipe 56 is covered with the exterior cover 23. The exhaust pipe 56 extends from the inside to the outside of the third case 24 through the second opening 42 of the third case 24. As seen in the side view, a rear end 320 of the lower edge 32 of the third case 24 is arranged rearward of the exhaust pipe 56. As seen in the side view, a rear end 310 of the upper edge 31 of the third case 24 is arranged forward of the exhaust pipe 56. As seen in the side view, the rear surface 34 of the third case 24 intersects the exhaust pipe 56.

As shown in FIG. 2, the oil pan 25 includes a front portion 57 and a rear portion 58. The front portion 57 of the oil pan 25 is arranged in front of the exhaust pipe 56. The exhaust pipe 56 extends through the lateral side of the rear portion 58 of the oil pan 25. As seen in the side view, the exhaust pipe 56 overlaps the rear portion 58 of the oil pan 25. As shown in FIG. 4, the exhaust pipe 56 overlaps with the front portion 57 of the oil pan 25 as seen in the rear view.

As shown in FIGS. 2 and 4, the exhaust pipe 56 includes an upper pipe 61 and a lower pipe 62. The upper pipe 61 is connected to the first exhaust passage 51. The lower pipe 62 is connected to the second exhaust passage 52. As shown in FIG. 4, the exhaust pipe 56 includes a bend, i.e., has a bent shape, between the upper pipe 61 and the lower pipe 62. The exhaust pipe 56 bends laterally inward from the upper pipe 61 to the lower pipe 62.

As shown in FIG. 2, as seen in the side view, the upper pipe 61 is arranged outside the third case 24. That is, as seen in the side view, the third case 24 does not overlap with the upper pipe 61. The upper pipe 61 extends behind the rear surface 34 of the third case 24. As shown in FIG. 4, the third case 24 overlaps the upper pipe 61 as seen in the rear view. The upper pipe 61 is arranged lateral to the center line C1 extending in the vertical direction of the outboard motor 100 as seen in the rear view. As shown in FIG. 2, the lower pipe 62 is arranged in the third case 24. That is, the third case 24 overlaps with the lower pipe 62 as seen in the side view. As shown in FIG. 4, the lower pipe 62 is arranged laterally inward of the upper pipe 61 as seen in the rear view. The lower pipe 62 overlaps with the center line C1 as seen in the rear view.

Figure 8:
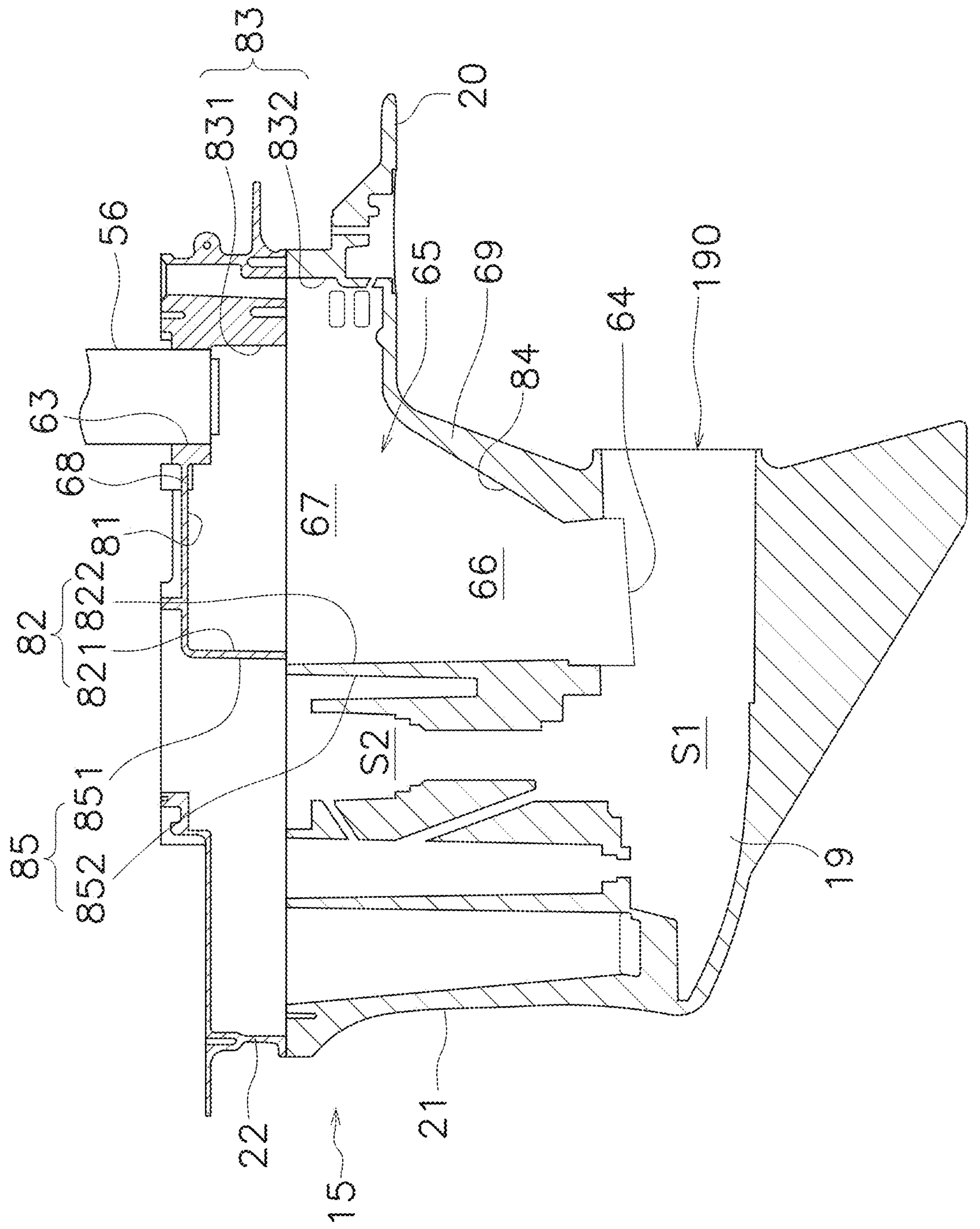
FIG. 8 is a cross-sectional view of a second case.

FIG. 8 is a cross-sectional view of the second case 15. As shown in FIG. 8, the second exhaust passage 52 (not shown) includes an exhaust inlet 63, an exhaust outlet 64, and an exhaust chamber 65. The exhaust inlet 63 is arranged on the upper surface of the attachment 22. The exhaust pipe 56 is connected to the exhaust inlet 63. As shown in FIG. 2, as seen in the side view, the exhaust inlet 63 is arranged directly below the exhaust hole 55 of the support frame 17. As seen in the side view, the front portion 57 of the oil pan 25 is arranged forward of the exhaust inlet 63. As shown in FIG. 4, as seen in the rear view, the exhaust inlet 63 is arranged laterally inward of the exhaust hole 55 of the support frame 17.

As shown in FIG. 8, the exhaust outlet 64 is arranged in the lower housing 21. The exhaust outlet 64 communicates with the first internal space S1 of the torpedo portion 19. The first internal space S1 is open at a rear end 190 of the torpedo portion 19. As seen in the side view, the rear end 190 of the torpedo portion 19 is arranged forward of at least a portion of the exhaust pipe 56. As seen in the side view, the exhaust outlet 64 is arranged forward of at least a portion of the exhaust inlet 63.

The exhaust chamber 65 communicates the exhaust inlet 63 with the exhaust outlet 64. The exhaust chamber 65 includes a flow path with a larger cross section than the exhaust pipe 56. The cross section of the flow path is a cross section parallel to the horizontal plane. The exhaust chamber 65 includes a lower chamber 66 and an upper chamber 67. The upper chamber 67 is a portion of the exhaust chamber 65 located higher than the cavitation plate 20. The lower chamber 66 is a portion of the exhaust chamber 65 located lower than the cavitation plate 20.

The upper chamber 67 communicates with the exhaust inlet 63. The upper chamber 67 is larger than the lower chamber 66 in the front-rear direction. The upper chamber 67 is larger than the exhaust pipe 56 in the front-rear direction. The upper chamber 67 is larger than the exhaust inlet 63 in the front-rear direction. The lower chamber 66 communicates with the exhaust outlet 64. The cross section of the flow path of the lower chamber 66 becomes smaller downward.

An inner surface of the exhaust chamber 65 includes a top surface 81, a front surface 82, a first rear surface 83, and a second rear surface 84. The top surface 81 extends forward from the exhaust inlet 63. The top surface 81 is longer than a diameter of the exhaust passage 50 in the front-rear direction. The front surface 82 is arranged forward of the exhaust inlet 63. The front surface 82 extends downward from a front end of the top surface 81. The front surface 82 extends from the top surface 81 to the exhaust outlet 64. The first rear surface 83 is arranged rearward of the exhaust inlet 63. The first rear surface 83 extends downward from the rear of the exhaust inlet 63. The second rear surface 84 is arranged lower than the first rear surface 83. The second rear surface 84 is inclined downward and forward.

Figure 9:
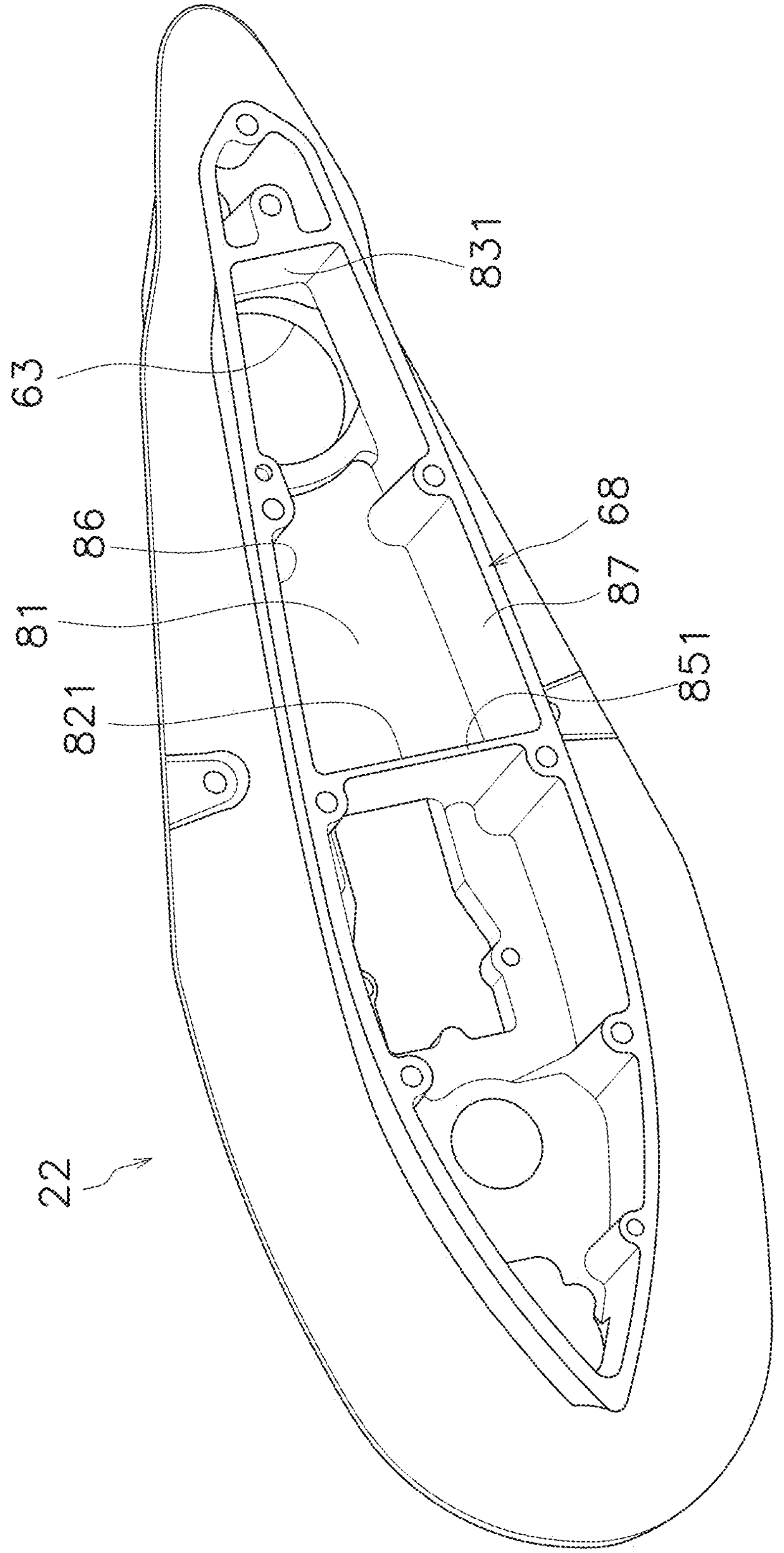
FIG. 9 is a perspective view of an attachment.
Figure 10:
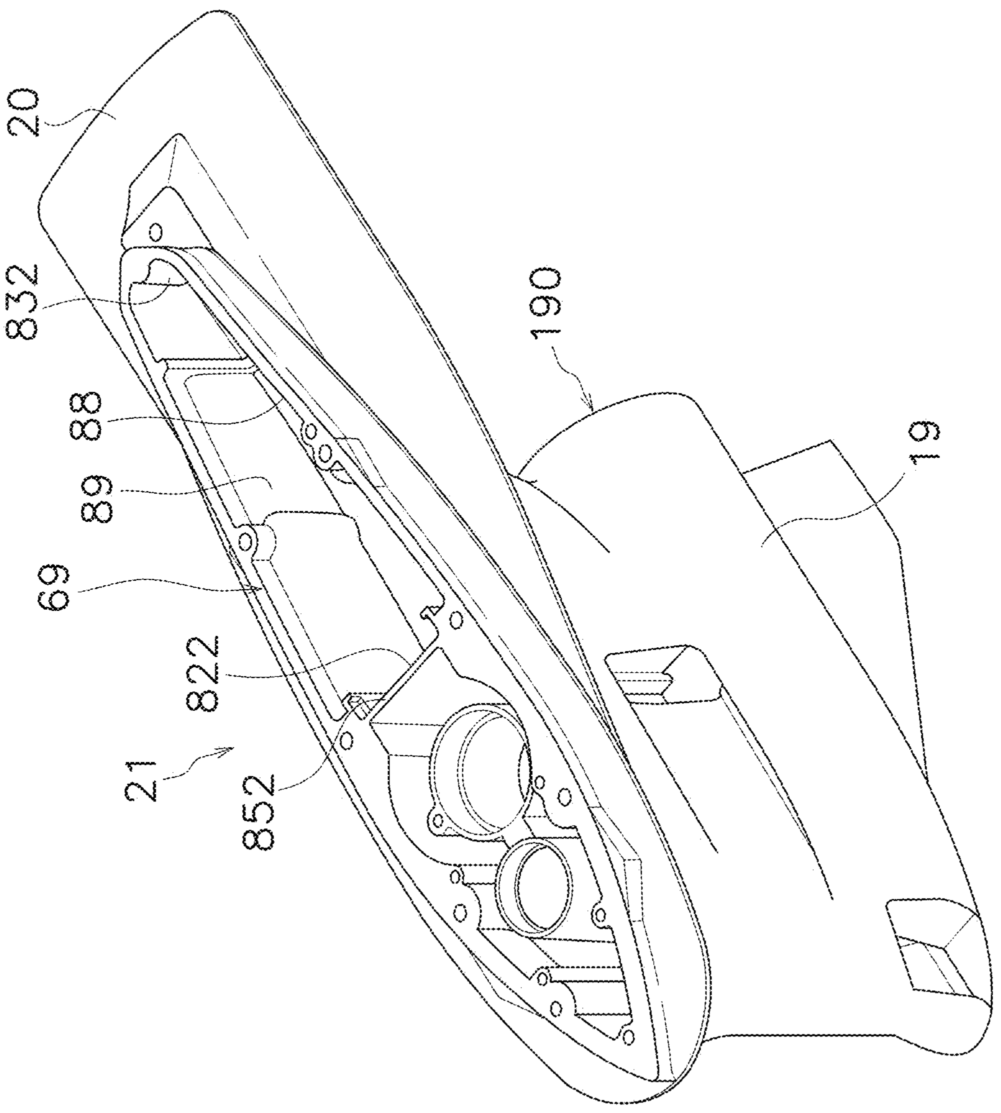
FIG. 10 is a perspective view of a lower housing.

The exhaust chamber 65 includes an upper chamber member 68 and a lower chamber member 69. The upper chamber member 68 and the lower chamber member 69 are separate bodies from each other. FIG. 9 is a perspective view of the attachment 22. FIG. 10 is a perspective view of the lower housing 21. As shown in FIGS. 8 and 9, the upper chamber member 68 is included in the attachment 22. The upper chamber member 68 includes the top surface 81, an upper portion 821 of the front surface 82, and an upper portion 831 of the first rear surface 83. Further, as shown in FIG. 9, the upper chamber member 68 includes a first left side surface 86 and a first right side surface 87. The upper chamber member 68 has a box shape that is surrounded by the top surface 81, the upper portion 821 of the front surface 82, the upper portion 831 of the first rear surface 83, the first left side surface 86, and the first right side surface 87, and opens downward.

As shown in FIGS. 8 and 10, the lower chamber member 69 is included in the lower housing 21. The lower chamber member 69 includes a lower portion 822 of the front surface 82, a lower portion 832 of the first rear surface 83, and the second rear surface 84. Further, as shown in FIG. 10, the lower chamber member 69 includes a second left side surface 88 and a second right side surface 89. The lower chamber member 69 has a box shape that is surrounded by the lower portion 822 of the front surface 82, the lower portion 832 of the first rear surface 83, the second rear surface 84, the second left side surface 88, and the second right side surface 89, and opens upward.

As shown in FIG. 8, the second case 15 includes the second internal space S2. The drive shaft 4 is arranged in the second internal space S2. The second internal space S2 is arranged in front of the exhaust chamber 65. The second internal space S2 and the exhaust chamber 65 are separated by a partition wall 85. The partition wall 85 extends in the vertical direction. The partition wall 85 includes a first wall portion 851 and a second wall portion 852. The first wall portion 851 is included in the attachment 22. The cross section of the flow path of the exhaust chamber 65 in the upper chamber member 68 is larger than the thickness of the first wall portion 851 in the front-rear direction. The second wall portion 852 is included in the lower housing 21. The cross section of the flow path of the exhaust chamber 65 in the lower chamber member 69 is larger than the thickness of the second wall portion 852 in the front-rear direction.

In the outboard motor 100 according to the present preferred embodiment, the exhaust inlet 63 to which the exhaust pipe 56 is connected and the exhaust outlet 64 communicating with the first internal space S1 of the torpedo portion 19 are connected each other through the exhaust chamber 65. Therefore, the degree of freedom in the arrangement of the exhaust inlet 63 and the exhaust outlet 64 is high, and as a result, the exhaust pipe 56 is able to have a linear shape as seen in the side view. Alternatively, the degree of bending of the exhaust pipe 56 in the front-rear direction is able to be reduced. As a result, the pressure loss in the exhaust pipe 56 is reduced, and the increase in size of the outboard motor 100 is prevented. Further, by providing a large volume of the exhaust chamber 65 in the second case 15, the pressure loss in the exhaust chamber 65 is reduced.

Although preferred embodiments of the present invention have been described above, the present invention is not limited to the above preferred embodiments, and various modifications can be made without departing from the gist of the present invention.

The structure of the outboard motor 100 is not limited to that of the above preferred embodiments, and may be modified. For example, the drive shaft 4 may extend through the third case 24. The structure of the first case 14, the second case 15, or the third case 24 is not limited to that of the above preferred embodiments, and may be modified. For example, the lower housing 21 and the attachment 22 may be integral. The left case 43 and the right case 44 may be integral. The third case 24 may be a cast product. In that case, instead of the exhaust pipe 56 described above, the third exhaust passage 53 may be configured by a partition wall integral with and inside the third case 24.

The configuration of the exhaust passage 50 is not limited to that of the above preferred embodiments, and may be changed. For example, the exhaust manifold 54 is not limited to a linear shape as seen in the side view, and may be slightly bent in the front-rear direction. The exhaust pipe 56 is not limited to a linear shape as seen in the side view, and may be slightly bent in the front-rear direction. The entire exhaust pipe 56 may be arranged outside the third case 24. The configuration of the exhaust chamber 65 is not limited to that of the above preferred embodiments, and may be changed.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An outboard motor comprising:
- an engine;
- a drive shaft extending downward from the engine;
- a propeller shaft connected to the drive shaft and extending in a front-rear direction of the outboard motor;
- a first case accommodating the engine;
- an upper housing below the first case;
- an exhaust passage at least partially in the upper housing and extending downward from the engine; and
- a second case below the upper housing; wherein
- the second case includes:
  - a torpedo portion including an internal space accommodating the propeller shaft and a rear end located forward of at least a portion of the exhaust passage as seen in a side view of the outboard motor;
  - an exhaust inlet to which the exhaust passage is connected;
  - an exhaust outlet to communicate with the internal space of the torpedo portion; and
  - an exhaust chamber to communicate the exhaust inlet with the exhaust outlet; and
- the exhaust passage consists of a singular pipe extending linearly, as seen in a side view of the outboard motor, from the engine to the second case.

2. The outboard motor according to claim 1, wherein, as seen in the side view, at least a portion of the exhaust outlet is located forward of the exhaust inlet.

3. The outboard motor according to claim 1, wherein the exhaust chamber includes a flow path with a larger cross section than the exhaust passage.

4. The outboard motor according to claim 1, wherein the exhaust chamber includes:
- a lower chamber to communicate with the exhaust outlet; and
- an upper chamber to communicate with the exhaust inlet and is larger than the lower chamber in the front-rear direction.

5. The outboard motor according to claim 1, wherein an inner surface of the exhaust chamber includes a top surface extending forward from the exhaust inlet.

6. The outboard motor according to claim 5, wherein the top surface is longer than a diameter of the exhaust passage in the front-rear direction.

7. The outboard motor according to claim 5, wherein the exhaust chamber includes:
- an upper chamber member including the top surface; and
- a lower chamber member that is separate from the upper chamber member.

8. The outboard motor according to claim 7, wherein the second case includes:
- an attachment that includes the upper chamber member and is connected to the upper housing; and
- a lower housing that includes the lower chamber member, is separate from the attachment, and is connected to the attachment.

9. The outboard motor according to claim 1, further comprising:
- an oil pan connected to the engine and at least partially forward of the exhaust inlet.

10. An outboard motor comprising:

an engine;

a drive shaft extending downward from the engine;

a propeller shaft connected to the drive shaft and extending in a front-rear direction of the outboard motor;

a first case accommodating the engine;

an upper housing below the first case;

an exhaust passage at least partially in the upper housing and extending downward from the engine; and a second case below the upper housing; wherein the second case includes:

a torpedo portion including an internal space accommodating the propeller shaft and a rear end located forward of at least a portion of the exhaust passage as seen in a side view of the outboard motor;

an exhaust inlet to which the exhaust passage is connected;

an exhaust outlet to communicate with the internal space of the torpedo portion; and an exhaust chamber to communicate the exhaust inlet with the exhaust outlet; and as seen in the side view, a front edge of the exhaust inlet is located rearward of a rear end of the torpedo portion.

11. An outboard motor comprising:

an engine;

a drive shaft extending downward from the engine;

a propeller shaft connected to the drive shaft and extending in a front-rear direction of the outboard motor;

a first case accommodating the engine;

an upper housing below the first case;

an exhaust passage at least partially in the upper housing and extending downward from the engine; and a second case below the upper housing; wherein the second case includes:

a torpedo portion including an internal space accommodating the propeller shaft and a rear end located forward of at least a portion of the exhaust passage as seen in a side view of the outboard motor;

an exhaust inlet to which the exhaust passage is connected;

an exhaust outlet to communicate with the internal space of the torpedo portion; and an exhaust chamber to communicate the exhaust inlet with the exhaust outlet; and as seen in the side view, a rear edge of the exhaust outlet is located forward of a front edge of the exhaust inlet.

* * * * *